United States Patent
Yang et al.

(10) Patent No.: US 9,654,991 B2
(45) Date of Patent: May 16, 2017

(54) RADIO PROPERTY BASED ACCESS POINT LOAD BALANCING IN CONTROLLER CLUSTER

(71) Applicant: Aruba Networks, Inc., Sunnyvale, CA (US)

(72) Inventors: Sheausong Yang, Saratoga, CA (US); Gopalakrishnan Raman, San Jose, CA (US); Partha Narasimhan, Saratoga, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 83 days.

(21) Appl. No.: 14/700,442

(22) Filed: Apr. 30, 2015

(65) Prior Publication Data
US 2016/0323781 A1    Nov. 3, 2016

(51) Int. Cl.
*H04W 24/02*    (2009.01)
*H04W 24/08*    (2009.01)
*H04W 88/12*    (2009.01)

(52) U.S. Cl.
CPC ........... *H04W 24/02* (2013.01); *H04W 24/08* (2013.01); *H04W 88/12* (2013.01)

(58) Field of Classification Search
None
See application file for complete search history.

(56) References Cited

U.S. PATENT DOCUMENTS

| | | | |
|---|---|---|---|
| 8,824,448 B1* | 9/2014 | Narayana | H04W 24/02 370/329 |
| 2007/0133394 A1* | 6/2007 | Walton | H04L 12/5601 370/216 |
| 2007/0133530 A1* | 6/2007 | Previdi | H04L 12/185 370/390 |
| 2008/0146230 A1* | 6/2008 | Pandian | H04W 36/0016 455/436 |
| 2011/0022676 A1* | 1/2011 | Thomson | H04W 8/12 709/208 |
| 2014/0092723 A1* | 4/2014 | Murphy | H04L 41/00 370/221 |
| 2015/0085745 A1* | 3/2015 | Atreya | H04W 24/02 370/328 |

(Continued)

*Primary Examiner* — Charles C Jiang
*Assistant Examiner* — Saad Khawar
(74) *Attorney, Agent, or Firm* — Brooks, Cameron & Huebsch, PLLC (57) ABSTRACT

The present disclosure discloses a system and a method for providing radio frequency based access point load balancing in a controller cluster. Specifically, a network device detects a long-term network topology change in a network having a controller cluster, wherein the controller cluster comprises a plurality of controllers, and automatically reassigns one or more of a plurality of access points that are managed by a first controller to a second and different controller in the controller cluster without interrupting network traffic to and from client devices associated with the one or more of the plurality of access points. The access points are located within a particular radio frequency neighborhood. Also, the one or more of the plurality of access points provide adequate coverage in the particular radio frequency neighborhood in the event that the first controller and its corresponding access points after the reassignment become unavailable.

19 Claims, 9 Drawing Sheets

(56) References Cited

U.S. PATENT DOCUMENTS

2015/0373561 A1* 12/2015 Huang .................. H04W 24/02
370/252
2016/0165463 A1* 6/2016 Zhang ................... H04W 24/04
370/218

* cited by examiner

| LOAD OF CONTROLLER1 410 | LOAD OF CONTROLLER2 420 | LOAD OF CONTROLLER3 430 | LOAD OF CONTROLLER4 440 |
|---|---|---|---|
| 125 | 125 | 125 | 0 |
| 110 | 125 | 125 | 15 |
| 110 | 110 | 125 | 30 |
| 110 | 110 | 110 | 45 |
| 95 | 110 | 110 | 60 |
| 95 | 95 | 110 | 75 |
| 95 | 95 | 95 | 90 |
| ⋮ | ⋮ | ⋮ | ⋮ |

FIG. 4

DETECT A LONG-TERM NETWORK TOPOLOGY CHANGE IN A NETWORK HAVING A CONTROLLER CLUSTER, WHEREIN THE CONTROLLER CLUSTER COMPRISES A PLURALITY OF CONTROLLERS
500

AUTOMATICALLY REASSIGN ONE OR MORE OF A PLURALITY OF ACCESS POINTS THAT ARE MANAGED BY A FIRST CONTROLLER TO A SECOND AND DIFFERENT CONTROLLER IN THE CONTROLLER CLUSTER WITHOUT INTERRUPTING NETWORK TRAFFIC TO AND FROM CLIENT DEVICES ASSOCIATED WITH THE ONE OR MORE OF THE PLURALITY OF ACCESS POINTS
520

RADIO PROPERTY BASED ACCESS POINT LOAD BALANCING IN CONTROLLER CLUSTER

FIELD

Embodiments of the present disclosure relate to network device management in a controller cluster. In particular, embodiments of the present disclosure describe a system and a method for providing radio frequency based access point load balancing in a controller cluster.

BACKGROUND

The assignment of access points (APs) to controllers in a controller cluster could be done in a variety of ways. For example, the APs can be assigned to the controllers based on AP groups to provide for geo-affinity. Thus, geographically co-located APs will be assigned to the same controller. As another example, APs can be assigned to controllers according to a "salt-and-pepper" deployment to provide for failover coverage. In the "salt-and-pepper" deployment, the APs within the same geographic area are interspersed across multiple controllers. Thus, failure of a single controller which affects all of the APs managed by the single controller will not cause loss of coverage area because the APs adjacent to those failed APs are still served by other controllers within the same geographic area. However, such AP assignments conventionally must be done manually by a network administrator and they have to be re-done when new APs has been added or existing APs have been decommission. Moreover, the "salt-and-pepper" deployment must have different controllers managing adjacent APs in a cohesive manner. Otherwise, a client device roaming from a first AP managed by a first controller to a second AP managed by a second controller may lose connectivity to the network. In addition, the "salt-and-pepper" deployment scheme could potentially cause disruptions in uniform communication applications (such as Lync®), fast roaming compliant to IEEE 802.11r standard, proprietary algorithms that match client devices to the best AP in its RF neighborhood (such as ClientMatch™), etc., which requires multiple controllers managing adjacent APs to work together seamlessly.

DETAILED DESCRIPTION

In the following description, several specific details are presented to provide a thorough understanding. While the context of the disclosure is directed to network device management in a controller cluster, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

FIGS. 2A-2B show exemplary access point assignment schemes according to embodiments of the present disclosure. Specifically.

OVERVIEW

Embodiments of the present disclosure relate to network device management in a controller cluster. In particular, embodiments of the present disclosure describe a method and system for providing radio frequency based AP load balancing in a controller cluster.

With the solution provided herein, a network device detects a long-term network topology change in a network having a controller cluster, wherein the controller cluster comprises a plurality of controllers, and automatically reassigns one or more of a plurality of access points that are managed by a first controller to a second and different controller in the controller cluster without interrupting network traffic to and from client devices associated with the one or more of the plurality of access points. The access points are located within a particular radio frequency neighborhood. Also, the one or more of the plurality of access points provide adequate coverage in the particular radio frequency neighborhood in the event that the first controller and its corresponding access points after the reassignment become unavailable.

Specifically, in some embodiments, the network device collects radio frequency neighborhood information and location information by each of the plurality of controllers in the controller cluster. Also, the network device exchanges the collected radio frequency neighborhood information and location information with other controllers in the controller cluster, and constructs an adjacency graph of access points and/or radios using the radio frequency neighborhood information collected by the plurality of controllers in the controller cluster. Then, the network device re-assigns adjacent access points in the adjacency graph to different controllers in the controller cluster, and validates that the one or more of the plurality of access points provide adequate coverage in the particular radio frequency neighborhood.

Networking Environment

Controller cluster architecture generally includes a plurality of interconnected network controllers collaborating with each other to manage both network devices (e.g., access points) and client devices in a network. The network may include multiple access points, each of which provides network services to a set of client devices.

Figure 1:
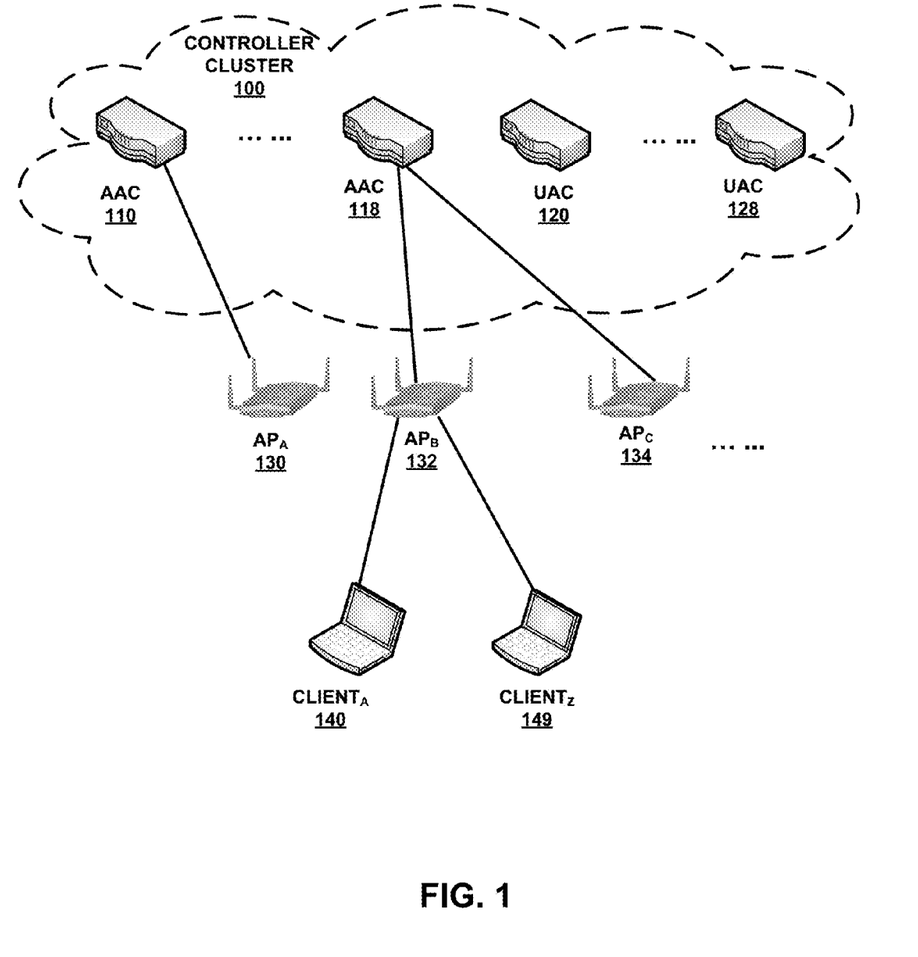
FIG. 1 shows an exemplary network environment according to embodiments of the present disclosure.

FIG. 1 shows an exemplary network environment illustrating an exemplary controller cluster architecture. The network environment as illustrated in FIG. 1 includes at least a controller cluster 100, a number of APs (such as $AP_A$ 130, $AP_B$ 132, $AP_C$ 134, etc.) and a number of client devices (such as $Client_A$ 140, $Client_Z$ 149, etc.). Each AP provides network services to zero or more client devices. Specifically, each AP operates on a particular wireless communication channel and communicates with its client devices on the particular wireless communication channel. For example, in FIG. 1, $AP_B$ 132 serves at least $Client_A$ 140 and $Client_Z$ 149.

Controller cluster 100 includes a plurality of interconnected network controllers collaborating with each other to manage both network devices (e.g., access points) and client devices in a network. A network controller generally refers to a controlling device that manages other network devices such as wireless access points. The network controller may handle automatic adjustments to radio frequency power, wireless channels, wireless authentication, and/or security.

Furthermore, network controllers in a controller cluster are divided into access point (AP) anchor controllers (also referred to as "AAC") and user anchor controllers (also referred to as "UAC"). Each AAC manages a set of APs in the network, whereas each UAC manages a set of client devices in the network.

Note that two client devices associated with the same AP may be managed by different UACs. For example, in FIG. 1, although both $Client_A$ 140 and $Client_Z$ 149 are associated with the same AP, namely $AP_B$ 132, $Client_A$ 140 and $Client_Z$ 149 may be managed by different UACs. For example, $Client_A$ 140 may be managed by UAC 120, whereas $Client_Z$ 149 may be managed by UAC 128.

Moreover, once a client device is assigned to an UAC, the client device will be managed by the same UAC as long as the client device roams within the same controller cluster. For example, assuming that $Client_A$ 140 initially was associated with $AP_B$ 132 and is now roaming to $AP_A$ 130. As shown in FIG. 1, $AP_B$ 132 is managed by AAC 118, but $AP_A$ 130 is managed by AAC 100. Thus, the APs that $Client_A$ 140 is associated with before and after the roaming are managed by two different AACs. Nonetheless, $Client_A$ 140 will be managed by the same UAC, e.g., UAC 120, throughout the roaming process.

Also, it is important to note that the AAC and UAC are logical entities. Therefore, an AAC module and a UAC module can co-exist within the same network controller device. In a simple example, controller cluster 100 may include two physical network controller devices, namely, $Controller_1$ and $Controller_2$. Half of the APs in the network are managed by the AAC module in $Controller_1$, and the other half of the APs in the network are managed by the AAC module in $Controller_2$. Meanwhile, each AP in the network serves a number of client devices. Assuming that a total of 100 client devices are served by the APs in the network. 50 of the client devices may be served by the UAC module in $Controller_1$, and the other 50 of the client devices may be served by the UAC module in $Controller_2$. The assignment of client devices to the UACs in the controller cluster is independent of the assignment of the APs to the AACs in the controller cluster. Therefore, it is possible that a client that is assigned to the UAC module in $Controller_1$ is associated with an AP that is assigned to the AAC module in $Controller_2$.

In some embodiments, the AAC module may be located in a computing cloud. Thus, the network controller devices in the controller cluster are exclusively managing client devices in the network.

Access Point Assignment Scheme

Figure 2A:
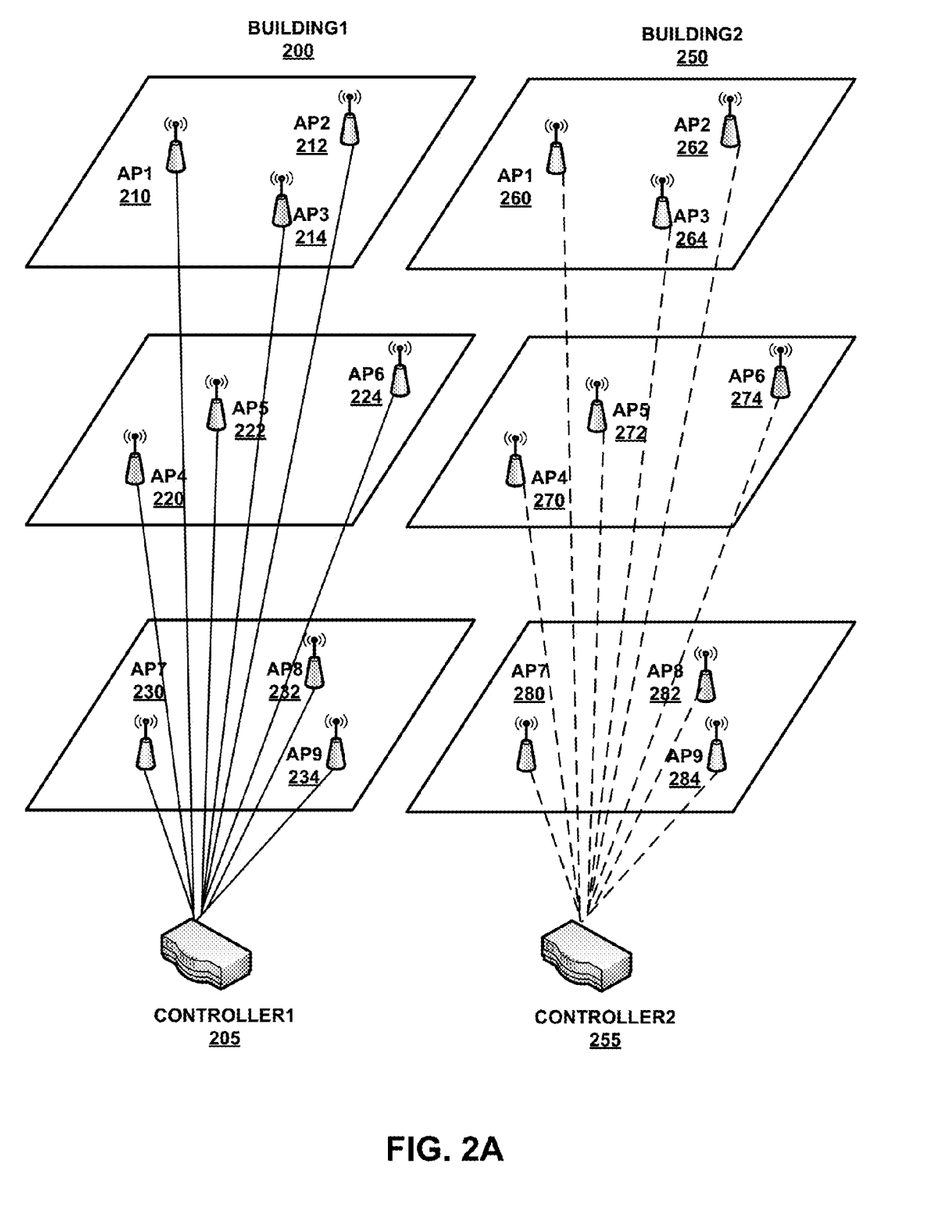
FIG. 2A shows AP assignment to controllers without salt-and-pepper assignment scheme.
Figure 2B:
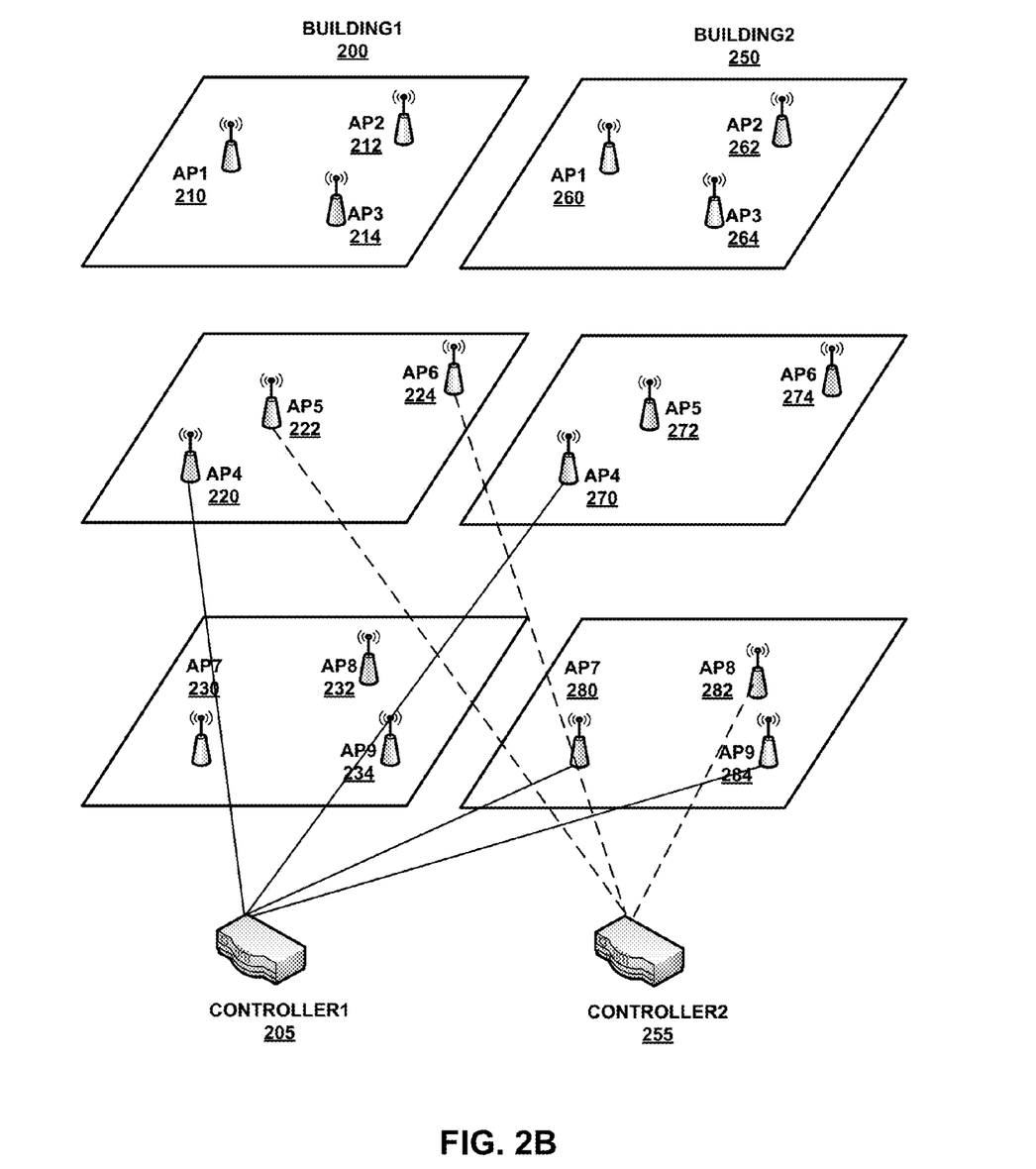
FIG. 2B shows an interspersed salt-and-pepper assignment.

The assignment of APs in the network to AACs in the controller cluster was conventionally performed via a manual process. FIGS. 2A-2B show exemplary access point assignment schemes according to embodiments of the present disclosure.

A. Geo-Affinity Based Assignment

One approach was to assign APs to AACs based on geo-affinity as illustrated in FIG. 2A. Here, all APs that are physically located in the same building may be assigned to the same AAC. Specifically, FIG. 2A includes a network deployed across two multi-story buildings, e.g., Building1 200 and Building2 250.

In this example, assuming that each building has three stories. In Building1 200, the top floor is deployed with AP1 210, AP2 212, and AP3 214; the second floor is deployed with AP4 220, AP5 222, and AP6 224; and, the ground floor is deployed with AP7 230, AP8 232, and AP9 234. There is only one controller, e.g., Controller1 205, physically located in Building1 200.

Likewise, in Building2 250, the top floor is deployed with AP1 260, AP2 262, and AP3 264; the second floor is deployed with AP4 270, AP5 272, and AP6 274; and, the ground floor is deployed with AP7 280, AP8 282, and AP9 284. There is only one controller, e.g., Controller2 255, physically located in Building2 250.

According to the AP assignment scheme illustrated in FIG. 2A, all of the APs that are physically located in Building1 200 are assigned to the AAC in Controller1 205; and, all of the APs that are physically located in Building2 250 are assigned to the AAC in Controller2 255. Typically, a client device will frequently move around the building and roam from one AP to another AP within the same building, causing intra-controller roaming, i.e., roaming from one AP to another AP managed by the same AAC controller. Occasionally, a user of a client device may travel from Building1 200 to Building2 250, causing inter-controller roaming, i.e., roaming from an AP managed by AAC Controller1 205 to another AP managed by AAC Controller2 255. The cost of inter-controller roaming is more expensive than the cost of intra-controller roaming. Thus, the AP assignment scheme as illustrated in FIG. 2A reduces the incidence of inter-controller roaming. However, when one controller (e.g., Controller1 205) fails, all of the AP in Building1 200 will fail over the other controller (e.g., Controller2 255). This will likely cause temporary disruption of services to client devices in Building1 200 because there is no radio coverage provided by any AP in that building.

B. Salt-and-Pepper Assignment

FIG. 2B illustrates an alternative approach to assign APs to AACs that is often referred to as "salt-and-pepper" assignment scheme. Here, all APs that are physically located in the same building may be assigned across AACs in different controllers, e.g., Controller1 205 and Controller2 255. From a load balancing perspective, it is advantageous to assign APs within the same geographic area to different controllers, so that a single controller failure will only have minimum impact on the APs in the particular geographic area. Furthermore, the "salt-and-pepper" assignment scheme attempts to avoid assigning the APs in a contiguous radio frequency (RF) neighborhood to the same controller, so that one controller failure will not cause fluctuation of network on adjacent APs if they are handled by a different controller.

Specifically, FIG. 2B includes a network deployed across two multi-story buildings, e.g., Building1 200 and Building2 250. In this example, assuming that each building has three stories and has the same AP deployment as in FIG. 2A.

According to the AP assignment scheme illustrated in FIG. 2B, some of the APs that are physically located in Building1 200 are assigned to the AAC in Controller1 205; and, other APs that are physically located in Building1 200 are assigned to the AAC in Controller2 255. Likewise, some of the APs that are physically located in Building2 250 are assigned to the AAC in Controller1 205; and, other APs that are physically located in Building2 250 are assigned to the AAC in Controller2 255. For example, AAC in Controller1 205 manages at least AP4 220 in the second floor of Building1 200, AP4 270 in the second floor of Building 250, AP7 280 and AP9 284 in the ground floor of Building 250, etc. Moreover, AAC in Controller2 255 manages at least AP5 222 and AP6 224 in second floor of Building1 200, AP8 282 in the ground floor of Building2 250, etc.

As previously mentioned, a client device will frequently move around the building and roam from one AP to another AP within the same building. Thus, the client device will necessarily cause frequent inter-controller roaming, i.e., roaming from an AP managed by AAC Controller1 205 to another AP managed by AAC Controller2 255. In order to provide seamless roaming to client devices in a "salt-and-pepper" assignment scheme, embodiments of the present disclosure uses a single UAC to manage a particular client device while the client device is associated with any AP managed by the controller cluster. In other words, during the roaming of a client device from one AP to another AP, regardless of whether the same AAC controller manages the APs, the client device will always be managed by the same UAC controller.

With the "salt-and-pepper" assignment scheme, when a controller (e.g., Controller1 205) fails, AP4 220, AP4 270, AP7 280, and AP9 284 will fail over to a backup controller and temporarily be unavailable. This will lead to a loss in the network capacity of the network in Building1 200 and Building2 250. However, the network should continue having sufficient coverage for the client devices, because the APs in the network are normally deployed with RF redundancy, which provides overlapped RF coverages with each other.

In some embodiments, the network system is deployed with sufficient redundancy. For example, assuming that both Controller1 205 and Controller2 255 can manage 18 APs, but each of Controller1 205 and Controller2 255 only manages 9 APs in the network. In such a deployment, usually each controller has a standby controller that acts as a backup controller in the event that the controller fails. When the network system is deployed with sufficient redundancy, and in the event that one controller fails, one or more other standby controllers will be able to take over the load of the failed controller. In the above example, if Controller1 205 fails, then Controller2 255 will have the capacity to manage all 18 APs in both Building1 200 and Building2 250.

In some embodiments, the network system may not have sufficient redundancy, for example, after multiple simultaneous controller failures. In such scenarios, even though the network will not be able to operate at the full capacity after the controller failures, a "salt-and-pepper" assignment scheme can ensure that the network still provides full coverage on all floors in both buildings.

Furthermore, network devices such as controllers will occasionally need software or firmware upgrades from an old version to a new version. The old version of the software may not be compatible with the new version. It is undesirable to shut down all APs and controllers at the same time in both buildings to upgrade the software, because this will cause both buildings to lose network service entirely. Thus, the controller upgrades are typically performed in a rolling upgrade manner. For example, the network administrator may first shut down Controller1 205 and all of the APs that Controller1 205 manages to install the new version of the software and then reboot to run the new version of the software. The process may take several minutes long. During this down time, a "salt-and-pepper" assignment scheme ensures that other APs managed by Controller2 255 in the same RF neighborhood continue to serve client devices in the area.

Automatic "Salt-and-Pepper" Assignment

With a large number of APs in the network, it could be difficult for a network administrator to manually assign the APs to the AACs in the controller cluster. In reality, many networks are manually configured using the geo-affinity based assignment because it is relatively easy for a network administrator. For example, in a campus environment, all of the APs in the Arts and Science Building may be assigned to Controller1; and, all of the APs in the Engineering Building may be assigned to Controller2. This assignment could create another problem because the Engineering Building may have twice as many APs as the Arts and Science Building to serve its large client base. If Controller2 is down, Controller1 may not have sufficient capacity to serve as the backup controller for Controller2. Thus, an optimal deployment would have one of the controllers to manage all APs in the Arts and Science Building and some APs in the Engineering Building. As the size of the campus grows, assigning APs to controllers and tracking each AP's controller assignment can become a daunting task when manually done.

Embodiments of the present disclosure provide a solution for automatic "salt-and-pepper" assignment in a network managed by a controller cluster. First, each AP in the network reports its RF-neighborhood information to the controller cluster. The RF-neighborhood information includes, but is not limited to, adjacent basic service set (BSS) heard over the air, the signal strength of received signals from client devices, the pass loss value, etc. Next, the AAC controllers in a controller cluster exchange the received RF-neighborhood information from the APs across all member controllers. Then, location information is assigned to each AP. The location information may include, but are not limited to, the building name, the floor, the x-y coordinates of the AP, the GPS location of the AP, etc. The location information may be obtained via triangulation based on received signal strength, or provided by a location engine storing location information of devices in the network.

Each controller in a controller cluster has a cluster manager. The cluster managers from all controllers in the controller cluster can self-elect a lead cluster manager. The lead cluster manager in a controller cluster has access to the entire data collected above, including the RF-neighborhood information, the location information, etc. Based on the RF-neighborhood information, the lead cluster manager can construct an adjacency graph of APs and/or radios, and perform an algorithm to assign adjacent APs in the RF neighborhood to different controllers in the controller cluster.

Figure 3A:
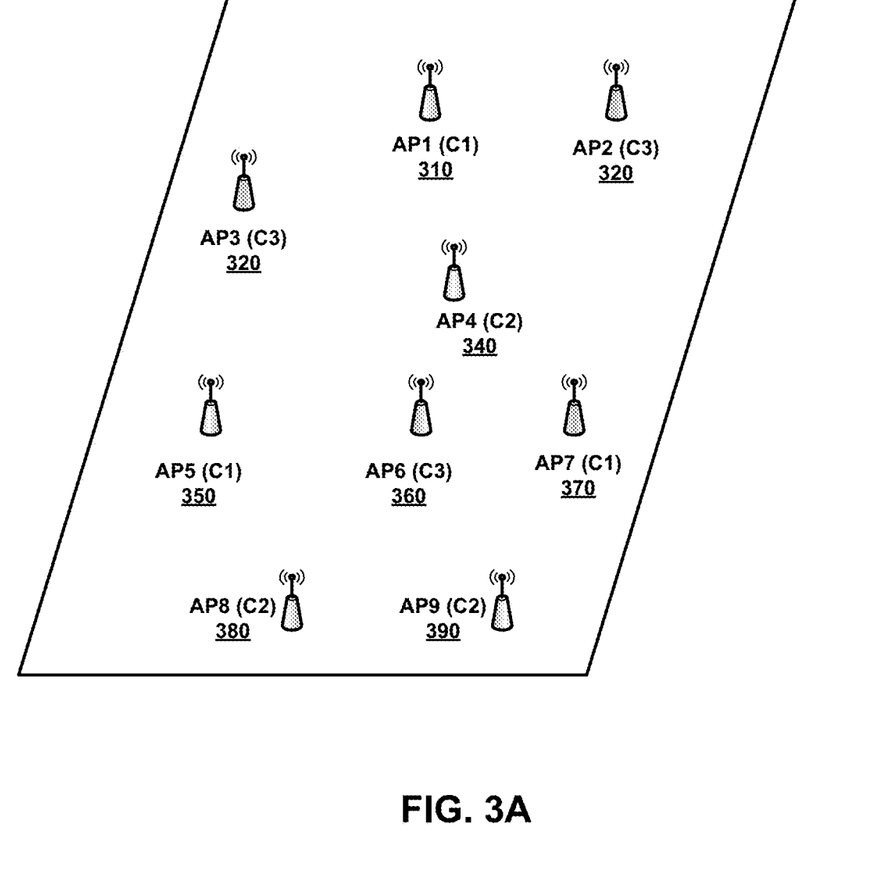
FIGS. 3A-3B shows exemplary access point assignment changes in response to a triggering event according to embodiments of the present disclosure.

For example, in FIG. 3A, assuming that the RF-neighborhoods of each AP are the followings:

AP1: {AP3, AP4}
AP2: {AP1}
AP3: {AP1, AP4}
AP4: {AP1, AP3, AP6, AP7}
AP5: {AP6, AP8}
AP6: {AP4, AP5, AP7, AP8, AP9}

AP7: {AP6, AP9}
AP8: {AP5, AP6}
AP9: {AP6, AP7, AP8}

The algorithm will iterate through the neighborhood of each AP, and assign a different controller to the APs in the neighborhood whenever possible. Assuming that there are three controllers in the network, namely, C1, C2, and C3. Thus, AP1 310 may be assigned to controller C1 at first. Because AP3 and AP4 are in the RF-neighborhood of AP1, AP3 is assigned to C3 and AP4 is assigned to C2 such that AP3 and AP4 are assigned to a different controller than C1. Then, the algorithm proceeds to examine AP2's RF-neighborhood. Because only AP1 is in the RF-neighborhood of AP2 and AP1 has already been assigned to C1, AP2 is then assigned to C3 to ensure that it is assigned to a different controller than C1. Next, AP3's RF-neighborhood is examined. The RF-neighborhood of AP3 includes AP1 and AP4, both of which have already been assigned to a controller different than C3 that AP3 is assigned to. So the algorithm proceeds to examine AP4 to AP9's RF-neighborhoods and complete the controller assignment in a similar manner.

Thereafter, based on the location information, the lead cluster manager can detect any coverage holes with the AP assignment scheme. If one or more coverage holes are detected, the AP assignment can be adjusted to remove the coverage holes. In the example illustrated in FIG. 3A, if C1 fails, then AP1 310, AP5 350, and AP7 370 will be down, leaving the floor with network coverage by AP2 320, AP3 330, AP4 340, AP6 360, AP8 380 and AP9 390. Because the lead cluster manager has the location information and coverage information of each AP, the lead cluster manager can compute whether the six APs left after C1 fails can sufficiently cover the entire floor. Similarly, the lead cluster manager can compute the network coverage map based on the assignment in FIG. 3A assuming that C2 and/or C3 fails. If the remaining APs are sufficient to cover the entire floor, the cluster manager can change the active AAC of any AP that needs to be reassigned according to the AP assignment plan in FIG. 3A. On the other hand, if the remaining APs form one or more coverage holes, the cluster manager can adjust the AP assignment to reduce or remove the coverage holes.

In some embodiments, the cluster manager can use an attenuation matrix over a physical coverage area, such as a building floor map or a campus map, to identify coverage holes after the automatic "salt-and-pepper" assignment, and select the best assignment among different assignment options. The attenuation matrix divides the coverage area into many smaller grids. Based on the signals received from a particular AP, the attenuation matrix tracks the estimated signal strength associated with a signal received from the particular AP in each grid. Multiple attenuation matrices can be aggregated to track estimated signal strength in each grid for multiple APs managed by the cluster cluster. To validate a "salt-and-pepper" assignment, the cluster manager can change value of the attenuation matrix associated with a subset of APs managed by a particular AAC controller to simulate those APs becomes no-functional, and determine whether each grid on the floor still have signal coverages.

In some embodiments, the cluster manager receives, from a network administrator, additional inputs (e.g., GPS locations) that are unavailable from network probing.

In some embodiments, the above validations for coverage holes can be extended to three dimensions by examining AP assignments in adjacent floors in the same building.

In some embodiments, the cluster manager can assign the desirable controller as standby AAC first, then trigger a failover event to transition the AP from the old controller to the newly assigned controller. This will ensure smooth transition during the adjustments of AP assignments in the network with a controller cluster.

Furthermore, the RF-neighborhood information and AAC assignment in the network can be persisted so that if an AP is rebooted, the network will recall the last assignment of the AAC controller, and continue to use the same assignment if so desired.

Upon long-term cluster membership changes, the automatic "salt-and-pepper" AP assignment algorithm can be run again and AAC assignments can be reassigned to balance the load among available set of controllers. The long-term cluster membership change may include, but are not limited to, controller failure over an extended period of time, additional controller being added to the controller cluster, removal of a large number of APs from the network, etc. Also note that the AAC assignment here may include both active AAC controller assignment and backup AAC controller assignment.

Figure 3B:
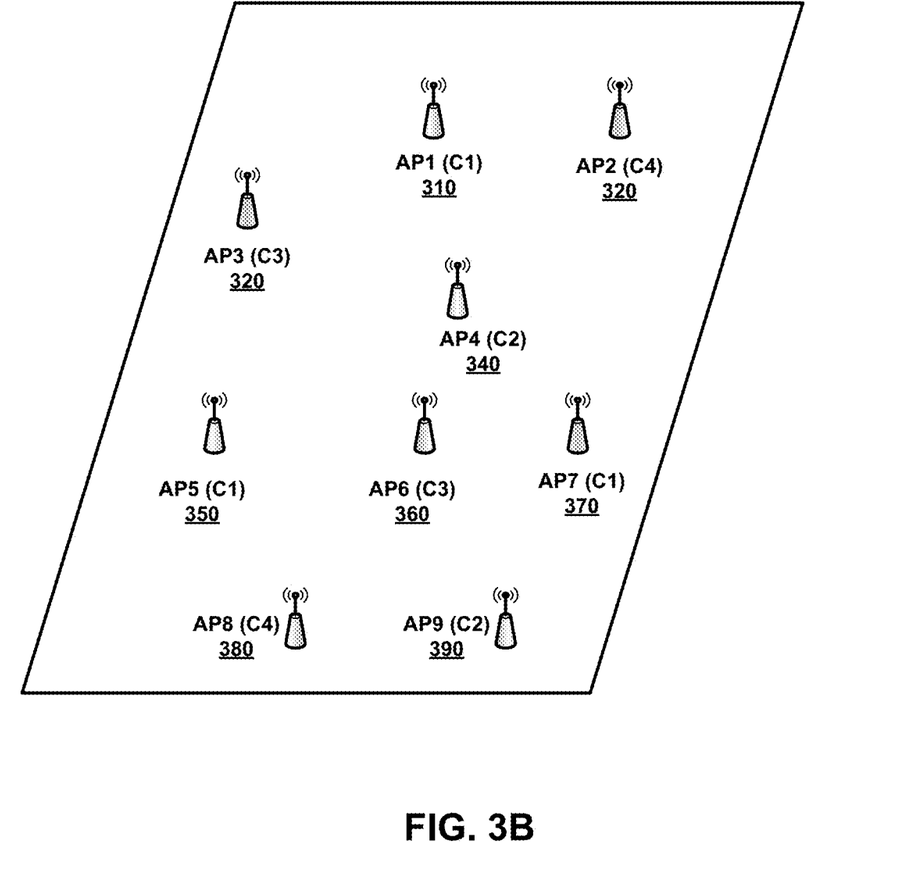

For example, in FIG. 3B, assuming that a new controller C4 is added to the controller cluster. This will trigger an automatic AP re-assignment based on the "salt-and-pepper" algorithm described above. In this example, according to the new AP "salt-and-pepper" assignment, AP2 320 and AP8 380 are re-assigned to C4. Note that the long-term cluster membership change, specifically the addition of C4 in this example, is automatically detected by the network. Moreover, such change automatically triggers an AP re-assignment to the AACs to adapt to the long-term cluster membership change. Therefore, compared with the conventional manual configuration of AP assignments, this mechanism greatly reduces the work of network system administrators.

Also, note that the assignment of APs to AAC controllers is separate and independent from the AP groups. Thus, traditionally, APs in the same AP group are typically assigned to the same controller. However, embodiments of the present disclosure allow APs in the same AP group to be assigned to different AAC controllers. Moreover, when an AP is assigned to a new controller (e.g., AP2 320 is re-assigned from C3 to C4), the AAC controller reassignment does not affect the AP grouping. Thus, AP2 can remain in the same AP group based on the same network policies. No additional configuration work needs to be done by the network administrator in response to this AP-to-AAC re-assignment.

Incremental Transition

Figure 4:
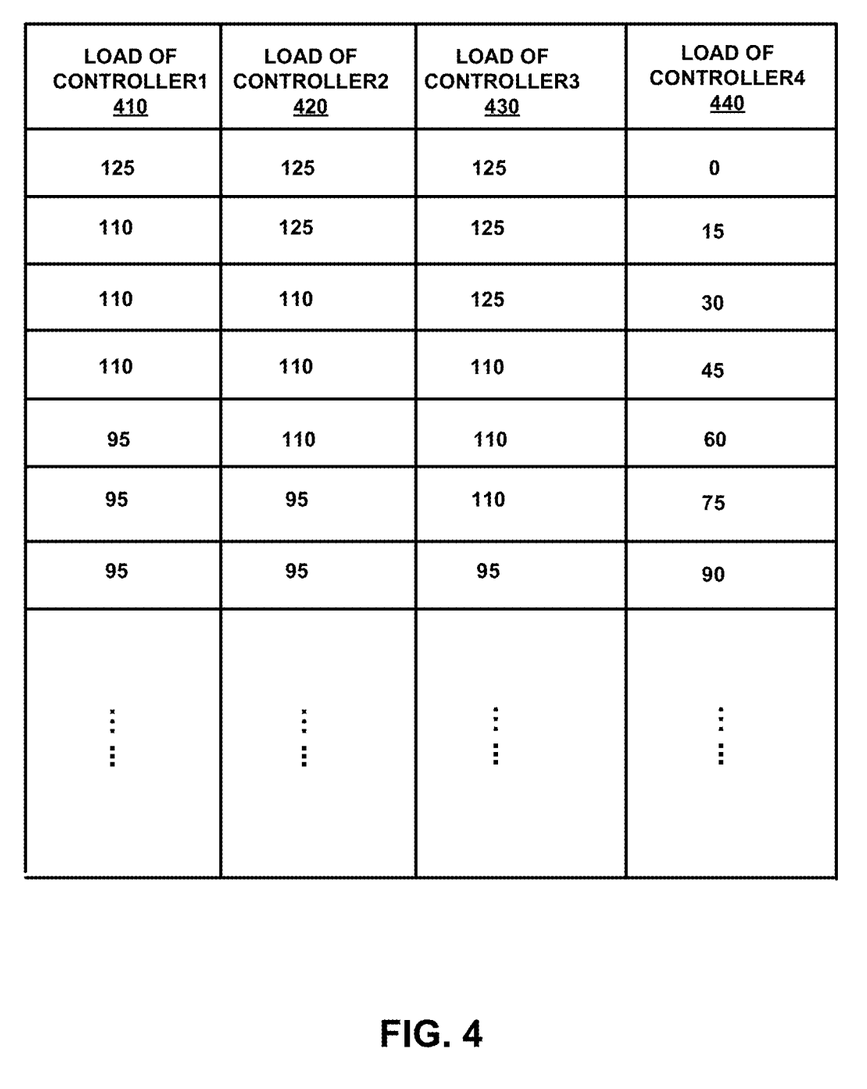
FIG. 4 shows a block diagram illustrating exemplary incremental changes in the loads of controllers in a controller cluster in response to a triggering event according to embodiments of the present disclosure.

FIG. 4 shows a block diagram illustrating exemplary incremental changes in the loads of controllers in a controller cluster in response to a triggering event according to embodiments of the present disclosure. In this example, assuming that the controller cluster has four controllers, namely Controller1, Controller2, Controller3, and Controller4.

As FIG. 4 shows, the loads of Controller1 410, Controller2 420, and Controller3 430 were initially 125 APs each. Thereafter, a new controller Controller4 440 joins the controller cluster. Because this is considered a long-term cluster topology change, the system will re-assign the APs to Controller1 410, Controller2 420, Controller3 430, and Controller4 440 in the controller cluster using the automatic "salt-and-pepper" assignment described in the previous sections. Ideally, the four controllers in the controller cluster will eventually be sharing same or similar amount of load.

Figure 5A:
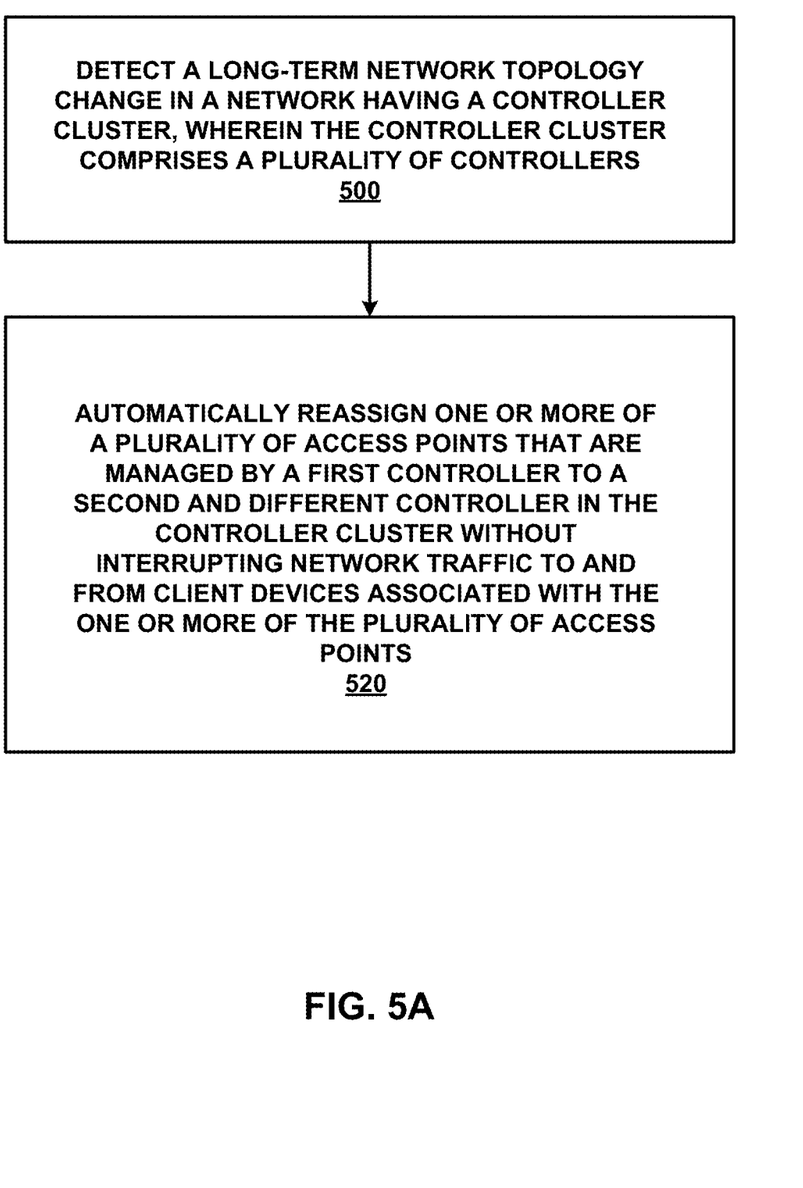
FIGS. 5A-5B illustrate an exemplary process for providing radio property based AP load balancing in a controller cluster according to embodiments of the present disclosure.
Figure 5B:
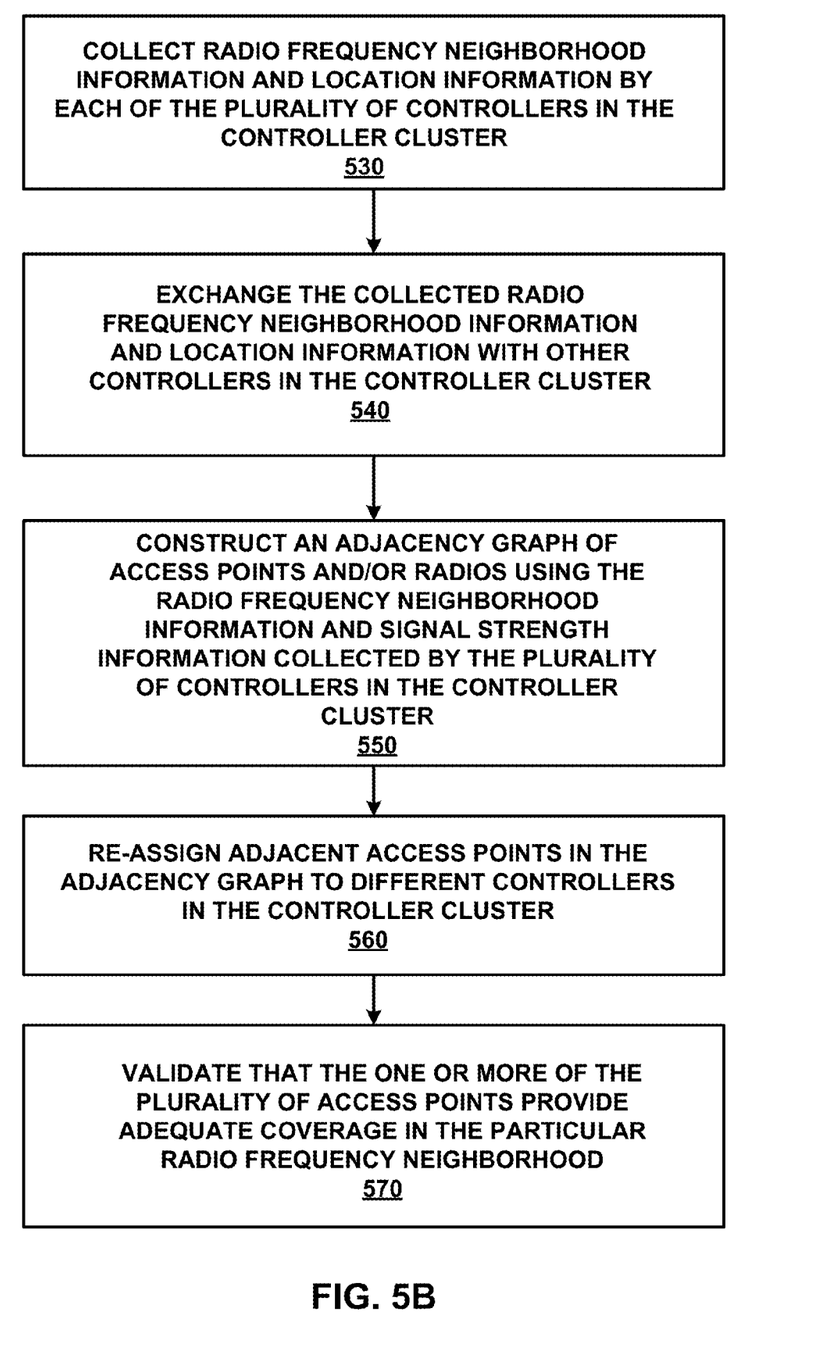

Nevertheless, the system may take multiple steps before transitioning all APs in the network to the re-assigned controllers. Specifically, the system may first calculate a reassignment scheme, which can be represented by a colored graph overlying on a floor map. Thereafter, the system can transition the APs re-assigned from Controller1 410 to Controller4 440 as a first step; transition the APs re-assigned from Controller2 420 to Controller4 440 as a second step; and the APs re-assigned from Controller3 430 to Controller4 440 as a third step. In some embodiments, to avoid a surge in the processor time affecting client traffic, the system may break down the APs to be transitioned into multiple smaller batches, and transition one batch at a time. In some embodiments, after transitioning the APs to the new controller in the controller cluster (e.g., Controller4 440), the system transitions other APs among Controller1 410, Controller2 420, and Controller3 430 according to the reassignment scheme.
Process for Providing Radio Property Based Access Point Load Balancing in a Controller Cluster FIGS. 5A-5B illustrate an exemplary process for providing radio property based access point load balancing in a controller cluster according to embodiments of the present disclosure. During operations, a network device detects a long-term network topology change in a network having a controller cluster, wherein the controller cluster comprises a plurality of controllers (operation 500). Moreover, in response to the long-term network topology change, the network device automatically reassigns one or more of a plurality of access points that are managed by a first controller to a second and different controller in the controller cluster without interrupting network traffic to and from client devices associated with the one or more of the plurality of access points (operation 520). Here, the access points are located within a particular radio frequency neighborhood. Also, the one or more of the plurality of access points provide adequate coverage in the particular radio frequency neighborhood in the event that the first controller and the access points managed by the first controller after the reassignment become unavailable.

Specifically, the network device can collect radio frequency neighborhood information and location information by each of the plurality of controllers in the controller cluster (operation 530). Then, the network device exchanges the collected radio frequency neighborhood information and location information with other controllers in the controller cluster (operation 540). Moreover, the network device can construct an adjacency graph of access points and/or radios using the radio frequency and signal strength neighborhood information collected by the plurality of controllers in the controller cluster (operation 550), and re-assigns adjacent access points in the adjacency graph to different controllers in the controller cluster (operation 560). Finally, the network device validates that the one or more of the plurality of access points provide adequate coverage in the particular radio frequency neighborhood (operation 570).

In some embodiments, the plurality of access points belongs to the same access point group before and after the one or more of the plurality of access points are reassigned.

In some embodiments, the plurality of controllers comprises a first subset of access point anchor controllers (AAC) managing access points in the network and second subset of user anchor controller (UAC) managing client devices in the network, and wherein a client device is assigned to the same UAC even if the client device roams from one access point managed by a first AAC to another access point managed by a second AAC.

The long-term topology change may include one or more of: a controller failure over an extended period of time; addition of a controller to the controller cluster; removal of a controller from the controller cluster; removal of a set of access points from the network; etc.

In some embodiments, the network device validates that the one or more of the plurality of access points provide adequate coverage in the particular radio frequency neighborhood by (1) dividing a floor plan corresponding to the radio frequency neighborhood into a plurality of grids; (2) tracking an estimated signal strength associated with a signal received from each access point in each grid in one or more attenuation matrices; (3) changing values of the grids associated with access points managed by the first controller in the one or more attenuation matrices to imitate effects of a failure of the first controller; and (4) determining whether the one or more of the plurality of access points provide adequate coverage in the particular radio frequency neighborhood based on the changed values in the one or more attenuation matrices.

Furthermore, in some embodiments, validating that the one or more of the plurality of access points provide adequate coverage in the particular radio frequency neighborhood involves applying the attenuation matrices to multiple floors corresponding to the particular radio frequency neighborhood; and determining whether the one or more of the plurality of access points provide adequate coverage in the particular radio frequency neighborhood based at least on the values corresponding to adjacent floors in the one or more attenuation matrices.

In some embodiments, the network device receives additional manual inputs that are unavailable to the network, and re-assigns the one or more of the plurality of access points from the first controller to the second controller based at least on the received additional manual inputs.

In some embodiments, the network device designates the second controller as a standby controller for the one or more of the plurality of access points, and triggers a failover event associated with the first controller to transition the one or more of the plurality of access points from being managed by the first controller to being managed by the second controller, in response to re-assigning the one or more of the plurality of access points from the first controller to the second controller.

In some embodiments, the network device can store access point re-assignment information in the controller cluster, and assign the one or more of the plurality of access point to the second controller in response to the one or more of the plurality of access point reboot after being re-assigned from the first controller to the second controller.

In some embodiments, in response to the long-term network topology change, the network device also automatically reassigns the one or more of a plurality of access points that are served by a third controller in the event of a failure of the first controller to be served by a fourth controller in the event of a failure of the second controller.

In some embodiments, the network device can incrementally transition the one or more of the plurality of access points to be managed from the first controller to the second controller based on current traffic activity of each access point. Specifically, the network device may temporarily refrain from transitioning a particular access point from the first controller to the second controller in response to detecting active multicast traffic through the particular access point. In addition, the network device may transition a particular access point from the first controller to the second controller in response to client traffic activity level through the particular access point is below a predefined threshold value.

Figure 6:
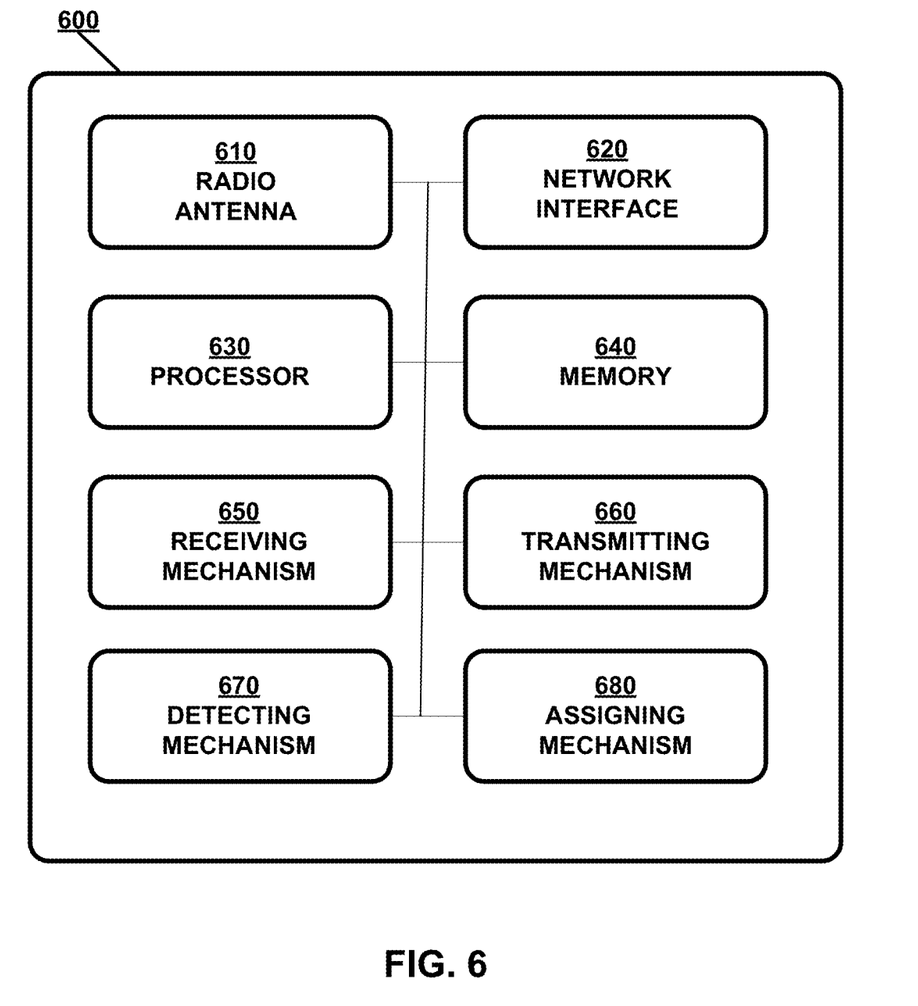
FIG. 6 is a block diagram illustrating an exemplary system for providing radio property based AP load balancing in a controller cluster according to embodiments of the present disclosure.

System for Providing Radio Property Based Access Point Load Balancing in a Controller Cluster FIG. 6 is a block diagram illustrating an exemplary system for providing radio property based access point load balancing in a controller cluster according to embodiments of the present disclosure. Network device 600 includes at least one or more radio antennas 610 capable of either transmitting or receiving radio signals or both, a network interface 620 capable of communicating to a wired or wireless network, a processor 630 capable of processing computing instructions, and a memory 640 capable of storing instructions and data. Moreover, network device 600 further includes a receiving mechanism 650, a transmitting mechanism 660, a detecting mechanism 670, and an assigning mechanism 680, all of which are in communication with processor 630 and/or memory 640 in network device 600. Network device 600 may be used as a client system, or a server system, or may serve both as a client and a server in a distributed or a cloud computing environment.

Radio antenna 610 may be any combination of known or conventional electrical components for receipt of signaling, including but not limited to, transistors, capacitors, resistors, multiplexers, wiring, registers, diodes or any other electrical components known or later become known.

Network interface 620 can be any communication interface, which includes but is not limited to, a modem, token ring interface, Ethernet interface, wireless IEEE 802.11 interface, cellular wireless interface, satellite transmission interface, or any other interface for coupling network devices.

Processor 630 can include one or more microprocessors and/or network processors. Memory 640 can include storage components, such as, Dynamic Random Access Memory (DRAM), Static Random Access Memory (SRAM), etc.

Receiving mechanism 650 generally receives one or more network messages via network interface 620 or radio antenna 610 from a wireless client. The received network messages may include, but are not limited to, requests and/or responses, beacon frames, management frames, control path frames, and so on.

Transmitting mechanism 660 generally transmits messages, which include, but are not limited to, requests and/or responses, beacon frames, management frames, control path frames, and so on.

Detecting mechanism 670 generally detects a long-term network topology change in a network having a controller cluster. Here, the controller cluster includes a plurality of interconnected controllers collaborating with each other to manage the APs and client devices in the network.

Assigning mechanism 680 generally reassigning one or more of a plurality of access points that are managed by a first controller to a second and different controller in the controller cluster without interrupting network traffic to and from client devices associated with the one or more of the plurality of access points automatically in response to detecting mechanism 670 detects the long-term network topology change. Here, the plurality of access points are located within a particular radio frequency neighborhood, and the one or more of the plurality of access points provide adequate coverage in the particular radio frequency neighborhood in the event that the first controller and the access points managed by the first controller after the reassignment become unavailable.

Specifically, assigning mechanism 680 can collect radio frequency neighborhood information and location information by each of the plurality of controllers in the controller cluster, and exchange the collected radio frequency neighborhood information and location information with other controllers in the controller cluster. Moreover, assigning mechanism 680 can construct an adjacency graph of access points and/or radios using the radio frequency neighborhood information collected by the plurality of controllers in the controller cluster, re-assigning adjacent access points in the adjacency graph to different controllers in the controller cluster, and validate that the one or more of the plurality of access points provide adequate coverage in the particular radio frequency neighborhood.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions executable by a processor to:
   detect a long-term network topology change in a network having a controller cluster, wherein the controller cluster comprises a plurality of controllers;
   in response to the long-term network topology change, automatically reassign a first access point of a plurality of access points that is managed by a first controller to a second controller in the controller cluster without interrupting network traffic to and from client devices associated with the plurality of access points, wherein the plurality of access points are located within a particular radio frequency neighborhood; and
   in response to the first controller being unavailable, the instructions further comprising instructions to:
      divide a floor plan corresponding to the radio frequency neighborhood into a plurality of grids;
      track an estimated signal strength associated with a signal received from each access point in each grid of the plurality of grids in an attenuation matrix;
      change values of each grid associated with the first access point in the attenuation matrix to imitate effects of a failure of the first controller; and
      determine and validate a second access point of the plurality of access points that reduces a coverage hole in the particular radio frequency neighborhood based on the changed values in the attenuation matrix.

2. The medium of claim 1, wherein the plurality of access points belongs to the same access point group before and after reassigning the plurality of access points.

3. The medium of claim 1, wherein the plurality of controllers comprises a first subset of access point anchor controllers (AAC) managing access points in the network and a second subset of user anchor controller (UAC) managing client devices in the network, and wherein a client device is assigned to the same UAC even if the client device roams from one access point managed by a first AAC to another access point managed by a second AAC.

4. The medium of claim 1, wherein the long-term topology change comprises at least one of:
   a controller failure over an extended period of time;
   addition of a controller to the controller cluster;
   addition of a plurality of access points to the network;
   removal of a controller from the controller cluster; and
   removal of a set of access points from the network.

5. The medium of claim 1, further comprising instructions to:
   collect radio frequency neighborhood information by each of the plurality of controllers in the controller cluster; and
   exchange the collected radio frequency neighborhood information with other controllers in the controller cluster.

6. The medium of claim 5, further comprising instructions to:
   construct an adjacency graph of access points and/or radios using the radio frequency neighborhood information and signal strength information collected by the plurality of controllers in the controller cluster; and
   reassign adjacent access points in the adjacency graph to different controllers in the controller cluster.

7. The medium of claim 1, further comprising instructions to:
   collect location information by each of the plurality of controllers in the controller cluster;
   exchange the collected location information with other controllers in the controller cluster; and
   validate an access point of the plurality of access points that reduces the coverage hole based on the collected location information in the particular radio frequency neighborhood.

8. The medium of claim 1, further corn instructions to:
   apply the attenuation matrix to multiple floors corresponding to the particular radio frequency neighborhood; and
   determine whether the second access point of the plurality of access points reduces the coverage hole in the particular radio frequency neighborhood based at least on the values corresponding to adjacent floors in the attenuation matrix.

9. The medium of claim 1, wherein the instructions to automatically reassign the plurality of access points further comprises instructions to:
   receive additional manual inputs that are unavailable to the network; and reassign the plurality of access points from the first controller to the second controller based at least on the received additional manual inputs.

10. The medium of claim 1, further comprising instructions to:
in response to re-assigning the one or more of the plurality of access points from the first controller to the controller, designate the second controller as a standby controller for the plurality of access points; and
trigger a failover event associated with the first controller to transition the plurality of access points from being managed by the first controller to being managed by the different controller.

11. The medium of claim 1, further comprising instructions to:
storing access point re-assignment information in the controller cluster; and
assigning an access point of the plurality of access points that is not previously assigned to the second controller to the second controller based on the stored re-assignment information in response to an event that the second access point of the plurality of access point reboot after being re-assigned from the first controller to the second controller.

12. The medium of claim 1, further comprising instructions to incrementally transition a particular access point of the plurality of access points to be managed from the first controller to the second controller based on current traffic activity of each access point.

13. The medium of claim 12, further comprising instructions to temporarily refrain from transitioning the particular access point from the first controller to the second controller in response to detecting active multicast traffic through the particular access point.

14. The medium of claim 12, further comprising instructions to transition the particular access point from the first controller to the second controller in response to client traffic activity level through the particular access point is below a predefined threshold value.

15. The medium of claim 1, further comprising instructions to determine and validate the second access point of the plurality of access points that removes the coverage hole in the particular radio frequency neighborhood based on the changed values in the attenuation matrix.

16. A network system comprising:
a plurality of controllers, each controller having at least a hardware processor;
the network system being configured to perform operations comprising:
detecting a long-term network topology change in a network having a controller cluster, wherein the controller cluster comprises a plurality of controllers; and
in response to the long-term network topology change, automatically reassigning a first access point of a plurality of access points that are managed by a first controller to a second controller in the controller cluster without interrupting network traffic to and from client devices associated with the plurality of access points, wherein the plurality of access points are located within a particular radio frequency neighborhood; and
in response to the first controller being unavailable, the operations further comprising:
dividing a floor plan corresponding to the radio frequency neighborhood into a plurality of grids;
tracking an estimated signal strength associated with a signal received from each access point in each grid of the plurality of grids in an attenuation matrix;
changing values of each grid associated with the first access point in the attenuation matrix to imitate effects of a failure of the first controller; and
determine and validate a second access point of the plurality of access points that reduces a coverage hole in the particular radio frequency neighborhood based on the changed values in the attenuation matrix.

17. The system of claim 16, wherein the operations further comprise:
collecting radio frequency neighborhood information and location information by each of the plurality of controllers in the controller cluster;
exchanging the collected radio frequency neighborhood information and location information with other controllers in the controller cluster;
constructing an adjacency graph of access points and/or radios using the radio frequency neighborhood information and signal strength information collected by the plurality of controllers in the controller cluster;
re-assigning adjacent access points in the adjacency graph to different controllers in the controller cluster; and
validating that the one or more of the plurality of access points provide adequate coverage in the particular radio frequency neighborhood.

18. A method comprising:
detecting, by a network device, a long-term network topology change in a network having a controller cluster, wherein the controller cluster comprises a plurality of controllers;
in response to the long-term network topology change, automatically reassigning, by the network device, a first access point of a plurality of access points that are managed by a first controller to a second controller in the controller cluster without interrupting network traffic to and from client devices associated with the plurality of access points, wherein the plurality of access points are located within a particular radio frequency neighborhood;
in response to the first controller being unavailable, dividing a floor plan corresponding to the radio frequency neighborhood into a plurality of grids;
tracking an estimated signal strength associated with a signal received from each access point in each grid in an attenuation matrix;
changing values of each grids associated with the first access point in the attenuation matrix to imitate effects of a failure of the first controller; and
determining and validate a second access point of the plurality of access points that reduces a coverage hole in the particular radio frequency neighborhood based on the changed values in the attenuation matrix.

19. The method of claim 18, further comprising:
collecting radio frequency neighborhood information and location information by each of the plurality of controllers in the controller cluster;
exchanging the collected radio frequency neighborhood information and location information with other controllers in the controller cluster;
constructing an adjacency graph of access points and/or radios using the radio frequency neighborhood information and signal strength information collected by the plurality of controllers in the controller cluster;

re-assigning adjacent access points in the adjacency graph to different controllers in the controller cluster; and validating that the one or more of the plurality of access points provide adequate coverage in the particular radio frequency neighborhood.

\* \* \* \* \*